United States Patent
Jasion et al.

(10) Patent No.: US 11,428,865 B2
(45) Date of Patent: Aug. 30, 2022

(54) HOLLOW CORE PHOTONIC BANDGAP OPTICAL FIBRES AND METHODS OF FABRICATION

(71) Applicant: University of Southampton, Southampton (GB)

(72) Inventors: Gregory Teofil Jasion, Southampton (GB); Francesco Poletti, Southampton (GB); Yong Chen, Southampton (GB); Eric Rodrigue Numakm Fokoua, Southampton (GB); Thomas David Bradley, Southampton (GB)

(73) Assignee: University of Southampton, Southampton (GB)

( * ) Notice: Subject to any disclaimer, the term of this patent is extended or adjusted under 35 U.S.C. 154(b) by 27 days.

(21) Appl. No.: 16/635,200

(22) PCT Filed: Aug. 1, 2018

(86) PCT No.: PCT/GB2018/052201
§ 371 (c)(1),
(2) Date: Jan. 30, 2020

(87) PCT Pub. No.: WO2019/025797
PCT Pub. Date: Feb. 7, 2019

(65) Prior Publication Data
US 2021/0088717 A1    Mar. 25, 2021

(30) Foreign Application Priority Data
Aug. 2, 2017 (GB) .................................. 1712451

(51) Int. Cl.
G02B 6/02 (2006.01)
C03B 37/012 (2006.01)
C03B 37/027 (2006.01)

(52) U.S. Cl.
CPC ...... *G02B 6/02328* (2013.01); *C03B 37/0122* (2013.01); *C03B 37/02781* (2013.01); *G02B 6/02347* (2013.01); *G02B 6/02357* (2013.01)

(58) Field of Classification Search
None
See application file for complete search history.

(56) References Cited

U.S. PATENT DOCUMENTS

2003/0230118 A1  12/2003  Dawes et al.
2003/0231846 A1  12/2003  Fajardo et al.
(Continued)

FOREIGN PATENT DOCUMENTS

WO   2015/040187 A1   3/2015
WO   2015/040189 A2   3/2015
WO   2015/040189 A3   3/2015

OTHER PUBLICATIONS

International Search Report and Written Opinion for corresponding Patent Application No. PCT/GB2018/052201 dated Nov. 9, 2018.
(Continued)

*Primary Examiner* — Chris H Chu
(74) *Attorney, Agent, or Firm* — Renner, Otto, Boisselle & Sklar, LLP

(57) ABSTRACT

A hollow core photonic bandgap optical fibre comprises: a cladding comprising capillaries in a hexagonal array and a hollow core formed by excluding a hexagonal group of nineteen capillaries from the centre of the hexagonal array. The core is inflated. A core size ratio is 1.26 or above, defined as a ratio of the core diameter to the cladding diameter normalized to the ratio of the core diameter to the cladding diameter in an undistorted hexagonal array; a first ring ratio is between 0.55 and 2.50, defined as a ratio of the length of radially aligned struts separating the capillaries of the first ring to the length of a strut in an undistorted hexagonal array; and a core node spacing is between 0.60
(Continued)

and 1.90, where defined as a ratio of a strut length around the core of a largest corner capillary and a strut length around the core of a smallest side capillary. The fabrication method comprises four different pressures for the core, corner capillary, side capillary and cladding.

16 Claims, 10 Drawing Sheets

(56) References Cited

U.S. PATENT DOCUMENTS

2010/0247046 A1* 9/2010 Dong ............... G02B 6/02347
385/123
2011/0085769 A1 4/2011 Dong et al.

OTHER PUBLICATIONS

GB Search Report for corresponding Patent Application No. GB1712451.2 dated Jan. 9, 2018.
Benabid, "Hollow-core photonic bandgap fibre: new light guidance for new science and technology," Philosophical Transactions of the Royal Society, published online, pp. 3439-3462, Oct. 20, 2006.
Morioka, et al., "Enhancing Optical Communications with Brand New Fibers," Beyond 100g Optical Communications, IEEE Communications Magazine, pp. S31-S42, Feb. 2012.
Roberts, et al., "Ultimate low loss of hollow-core photonic crystal fibres," Optical Society of America, Optics Express, vol. 13, No. 1, pp. 236-244, Jan. 10, 2005.
Sleiffer, et al., "High Capacity Mode-Division Multiplexed Optical Transmission in a Novel 37-cell Hollow-Core Photonic Bandgap Fiber," Journal of Light Wave Technology, vol. 32, No. 4, pp. 854-863, Feb. 15, 2014.
Fokoua, et al., "Impact of structural distortions on the performance of hollow-core photonic bandgap fibers," Optical Society of America, vol. 22, No. 3, pp. 2735-2744, Feb. 10, 2014.
Jasion, et al., "MicroStructure Element Method (MSEM): viscous flow model for the virtual draw of microstructured optical fibers," Optical Society of America, vol. 23, No. 1, pp. 312-329, Jan. 12, 2015.
Fokoua, et al., Accurate modelling of fabricated hollow-core photonic bandgap fibers, Optical Society of America, vol. 23, No. 18, pp. 23117-23132, Sep. 7, 2015.
Jasion, et al., "Combining Fluid Dynamics and Electromagnetics Modelling to Improve Hollow Core Photonic Band Gap Fibres," Workshop on Specialty Optical Fibers and Their Applications, 2015.
Poletti, "Direct and inverse design of microstructured optical fibres," University of Southampton Research Repository ePrints Soton, Faculty of Engineering, Science and Mathematics Optoelectronics Research Centre, University of Southampton, http://eprints.soton.ac.uk, May 2007.
Chen, et al., "Understanding Wavelength Scaling in 19-Cell Core Hollow-Core Photonic Bandgap Fibers," Optical Society of America, 2014.

* cited by examiner

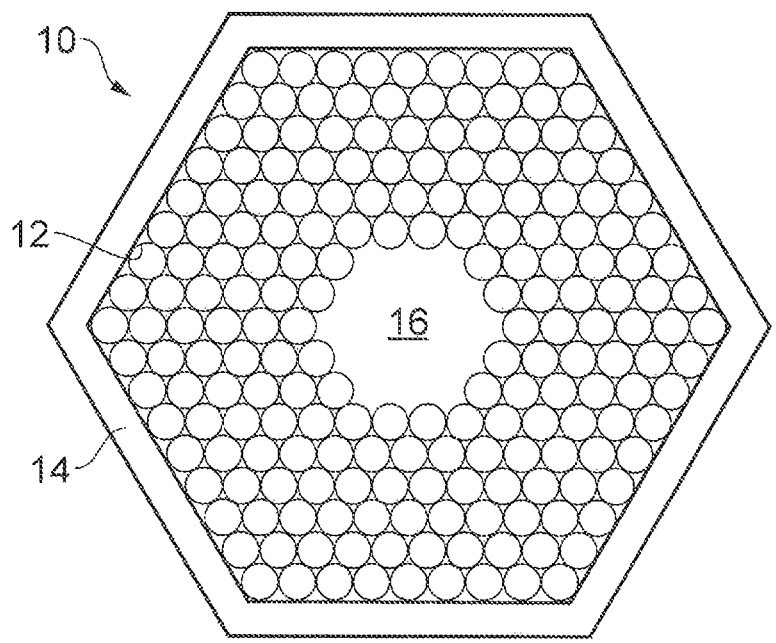
FIG 1
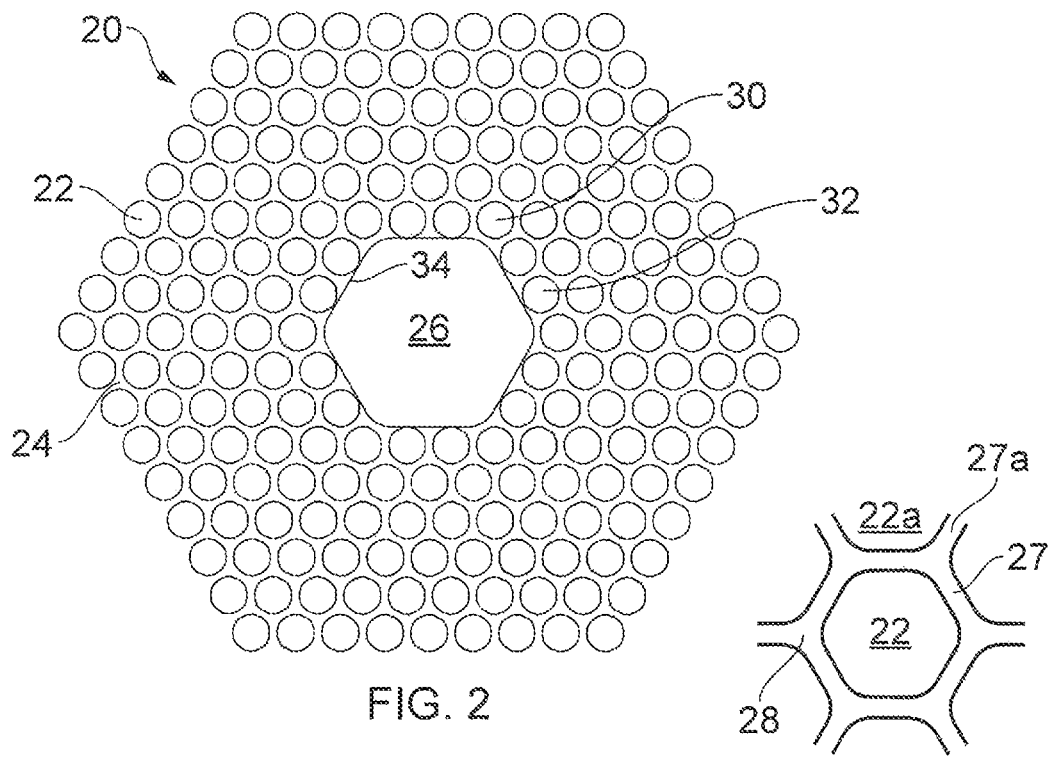
FIG. 2
FIG. 2A

US 11,428,865 B2

HOLLOW CORE PHOTONIC BANDGAP OPTICAL FIBRES AND METHODS OF FABRICATION

BACKGROUND OF THE INVENTION

The present invention relates to optical fibres, in particular hollow core photonic bandgap optical fibres, and methods for fabricating this type of optical fibre.

Hollow core photonic bandgap fibres (HC PBGFs), also known as hollow core photonic crystal fibres (HC PCFs), are a type of glass-based optical fibre in which light is guided in a hollow core (typically filled with air, but alternatively with a different gas or a vacuum) surrounded by a periodic microstructured glass cladding. This gives the cladding a periodically structured refractive index and hence a photonic bandgap. Typically, the cladding is formed as a periodic arrangement of longitudinal air holes in silica, commonly fabricated from a hexagonal array or stack of silica capillary tubes which are reduced in scale and fused together through a fibre drawing process. A number of capillaries at the centre of the stack are excluded before fusing to define the hollow core.

The photonic bandgap in the cladding very efficiently confines propagating light inside the fibre core, by acting as a low loss mirror. Very little light propagates in the cladding material, so the bulk properties of the cladding glass have little effect on the optical propagation characteristics of the fibre. This enables HC PBGFs to have a number of attractive properties, including low transmission loss and vacuum light speed signal transmission. These fibres therefore have potential for applications in low latency data transmission, for example.

HC PBGFs are made by stacking glass capillaries into the required hexagonal or honeycomb array or lattice, and removing a group of capillaries from the centre of the stack to make the core. An example arrangement is to remove or exclude nineteen capillaries (also referred to as cells) for the core, comprising a single central capillary and two surrounding rings of capillaries. This leaves a hexagonal void in the centre of the stack. Other examples exclude three, seven or 37 capillaries, where the former gives a triangular void instead of a hexagonal void. During fabrication, the stack (known as a preform) is heated and pulled (drawn) under tension, and the melted or softened glass of the capillaries becomes fused together. Surface tension acts on the various glass surfaces, and is stronger in the small capillaries than in the larger core hole. Therefore, to control the development of the cross-sectional structure of the fibre as it is drawn, two separate pressures can be applied to the cladding and the core to achieve a desired configuration [1]. Optionally, a thin-walled capillary (referred to as a core tube) may be inserted into the void created by removing the group of capillaries in the initial capillary stack to facilitate pressurization and to improve fibre consistency during drawing. This capillary becomes an integral part of the core boundary on fibre drawing, thickening slightly the core boundary relative to the case of drawing without a core tube.

The dominant optical propagation loss mechanism in HC PBGFs is surface scattering at the boundary where the cladding surrounds the core. Increasing the radius of the core leads to a loss reduction proportional to the square of the radius, due to a reduced interaction between the optical field propagating along the core and any surface roughness at the boundary [2]. The current lowest reported loss value for a HC PBGF has been demonstrated at 1.7 dB/km in fibres with a 19 cell core [3]. However, no further reduction in loss has been demonstrated even for fibres with a larger 37 core cell [4]. This is because the very large difference in size between the large core and the individual capillary or cell voids in the cladding of the initial preform makes the structure extremely difficult to control during the draw process, owing to the large difference in surface tension. Typically, deformations in the region of the cladding surrounding the core are produced, and these are associated with increased surface scattering loss [5].

A proposed approach to mitigating this effect is to use a preform of the smaller 19 cell core size and to inflate the core size relative to the cladding during the draw by increasing the pressure within the core [6]. However, increasing the core pressure while keeping all other draw parameters constant produces severe structural distortions in the cladding array. This gives an increased loss, despite the larger core size.

Some improvement in loss has been suggested by controlling of the draw process via three pressures applied to the cladding and core to reduce distortion and achieve a roughly constant cell wall length along the core boundary [7, 8, 9]. However, further reductions in propagation loss are of interest.

SUMMARY OF THE INVENTION

Aspects and embodiments are set out in the appended claims.

According to a first aspect of certain embodiments described herein, there is provided a hollow core photonic bandgap optical fibre comprising: a cladding comprising capillaries in a hexagonal array, the capillaries separated from each other by struts connected at nodes, the cladding having a cladding diameter; and a hollow core formed by excluding a hexagonal group of nineteen capillaries from the centre of the hexagonal array, the core having a core diameter; wherein the core is bounded by a first ring of capillaries comprising corner capillaries disposed adjacent to corners of the excluded group and side capillaries positioned between the corner capillaries; and the hexagonal array has dimensions such that: a core size ratio is 1.26 or above; where the core size ratio is defined as a ratio of the core diameter to the cladding diameter normalized to the ratio of the core diameter to the cladding diameter in an optical fibre formed from the same number and arrangement of capillaries in an undistorted hexagonal array; a first ring ratio is between 0.55 and 2.50 inclusive; where the first ring ratio is defined as a ratio of the length of radially aligned struts separating the capillaries of the first ring to the length of a strut in an undistorted hexagonal array with a core size ratio of 1; and a core node spacing is between 0.60 and 1.90 inclusive; where the code node spacing is defined as a ratio of a strut length around the core of a largest corner capillary and a strut length around the core of a smallest side capillary.

According to a second aspect of certain embodiments described herein, there is provided a method of fabricating a hollow core photonic bandgap optical fibre comprising: providing a preform comprising capillaries in a hexagonal array with a central void formed by exclusion of a group of nineteen capillaries from the centre of the hexagonal array, the capillaries including a first ring of capillaries around the central void, the first ring comprising corner capillaries disposed adjacent to corners of the excluded group and side capillaries positioned between the corner capillaries; and drawing the preform into a optical fibre such that the capillaries fuse to create a cladding for the fibre, the central void creating a core for the fibre; wherein during the drawing a first pressure is applied to the central void to create the core for the optical fibre, a second pressure is applied to the corner capillaries, a third pressure is applied to the side capillaries and a fourth pressure is applied to the remaining capillaries, such that: the first pressure is less than the fourth pressure; the fourth pressure is less than the second pressure; and the second pressure is less than the third pressure.

According to a third aspect of certain embodiments described herein, there is provided a hollow core photonic bandgap optical fibre fabricated using the method of the first aspect.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, a hollow core photonic bandgap optical fibre or a method for fabricating a hollow core photonic bandgap optical fibre may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which:

FIG. 1 shows a cross-sectional depiction of an example preform for fabricating an optical fibre, to which present embodiments and examples may be applied;

FIG. 2 shows a cross-sectional depiction of an example cane or optical fibre such as may be made from the example preform in FIG. 1;

FIG. 2A shows an enlarged view of a portion of FIG. 2;

DETAILED DESCRIPTION

Figure 3A:
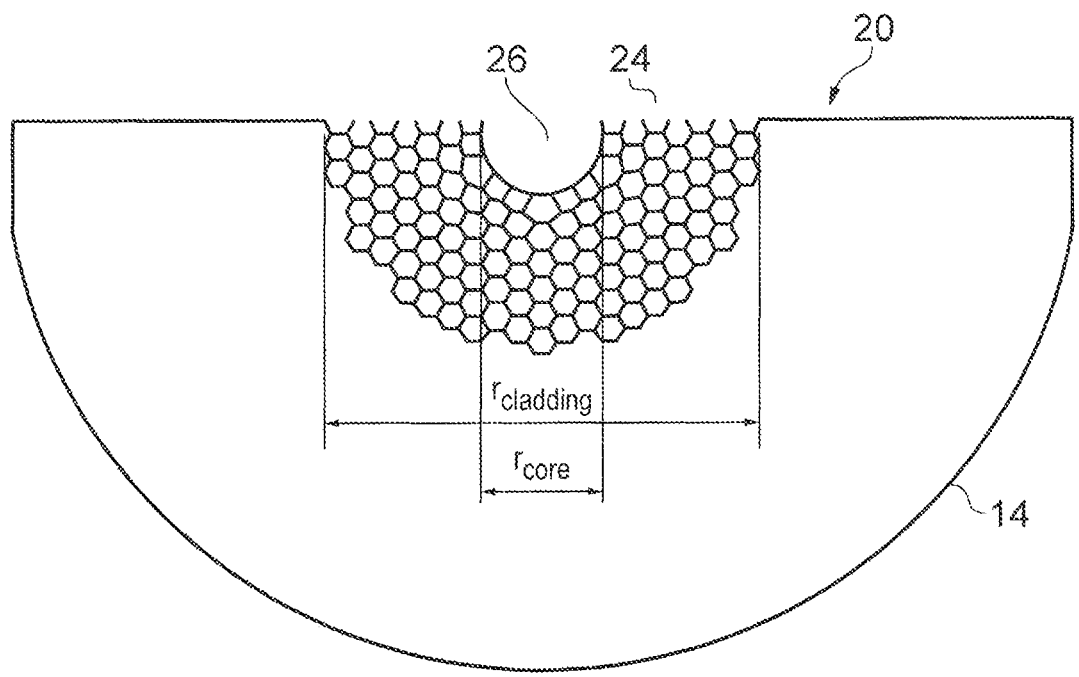
FIGS. 3A and 3B show a cross-sectional view of parts of an optical fibre marked with various parameters utilized in the present examples.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

Embodiments of the present disclosure relate to hollow core photonic bandgap optical fibres having structural parameters defined within a particular regime that gives lower optical loss than that achievable from known fibres of this type. Also, methods for manufacturing fibres with the proposed structures are also discussed.

FIG. 1 shows an example, as a transverse cross-sectional view through an elongate structure, of a preform or capillary stack from which a HC PBGF can be fabricated. The preform 10 comprises a plurality of glass (silica) capillary tubes 12 or capillaries stacked or arranged in a hexagonal array. The stack is clad in an outer glass jacket 14 in this example; this may be omitted or added at a later stage in different fabrication techniques. The capillary tubes 12 will form the cladding of the fibre. To form the core, a central group of tubes are omitted or excluded from the stack (removed after stacking or not included in the stack). This creates a central void 16 which will become the hollow core of the finished fibre. In this example, the central group of excluded capillaries comprises 19 capillaries, comprising the single central capillary and two rings of capillaries immediately surrounding the central capillary. The hexagonal geometry means that the central capillary is immediately surrounded by six neighboring capillaries, which in turn are surrounded by twelve capillaries, so that the group comprises 19 capillaries in total. This leaves a further six rings of capillaries surrounding the void 16, which will form the cladding. Other examples of fibres may comprise more or fewer rings around the core.

In the FIG. 1 example the capillary tubes have a circular cross section, so that small voids are present between the stacked tubes; in the current examples these are expected to be filled by flowing molten glass in the fibre drawing process so that the cladding comprises only holes corresponding to the central lumen of each capillary. In other fabrication techniques, tubes of other cross-sectional shapes can be stacked to create a preform.

FIG. 2 shows a cross-section of a fibre formed by drawing the preform of FIG. 1 using conventional fibre fabrication methods. The jacket 14 is not shown. The separate capillary tubes are fused together as the glass from which they are formed melts, to give a silica matrix with a plurality of longitudinal holes or voids 22 extending through it, which is the cladding 24 of the fibre. Each hole 22 corresponds to a lumen of one of the original capillary tubes, so the holes are arranged in the same hexagonal array as the stacked tubes. The holes 22 thus define a regular honeycomb structure, and the periodicity of the arrangement gives the photonic bandgap properties required for the fibre cladding 24.

This fused structure may be the finished fibre, or may be an intermediate stage in the fibre fabrication, known as a cane, which has an outer diameter intermediate between that of the preform and the fibre and can be drawn further to create the finished fibre.

Note that in the various stages of the preform, the cane and the fibre, terms used to describe the longitudinal holes 22 or voids through the cladding 24 may be described as capillaries (referring to either or both of the original glass tubes as shown in FIG. 1, and the central holes or lumen therein) or as cells. These terms are used interchangeably in the present disclosure, and may apply to these apertures in a preform, a cane or a fibre.

In the cane or the fibre, the fused glass of the capillary tubes forms dividing walls which surround each cell and separate a cell from its adjacent neighbors. These walls or partitions can be thought of as struts. The struts are connected at nodes, such that in the main part of the cladding, owing to the hexagonal geometry, each cell is bounded by six struts connected by six nodes.

FIG. 2A shows an enlarged view of a single cell 22 from the fibre of FIG. 2, to illustrate how the boundary of the cell (the glass wall surrounding the open void) is formed from six glass struts 27, where each strut divides the cell 22 from one of the six immediately neighboring cells 22a. A glass node 28 is located between the ends of each pair of adjacent struts 27. Hence the wall of the cell 22 is continuous, and made up of six struts and six nodes. A further strut 27a extends radially outwards from each node 28, such that each strut 27a is a separating wall between an adjacent pair of the neighboring cells 22a, and each node 28 is a junction of three struts 27, 27a. This structure is defined by the hexagonal form of the cell array, and is repeated through the bulk of the cladding. The glass structure extends in the same arrangement in the longitudinal direction (into and/or out of the plane of the page), along the length of the fibre 22 or the cane.

Returning to FIG. 2, the central large void is the core 26 of the fibre 20, formed from the absence of the central 19 capillaries excluded from the original preform stack. Although this is shown as having a roughly hexagonal shape in FIG. 2, in reality the surface tension in the melted glass tends to produce a more circular cross-section for the core. The cells are arranged in concentric rings around the core, since the structure of the preform is preserved in the fibre; hence the FIG. 2 example has six rings of cells surrounding the core, which was formed by excluding the central group of 19 capillaries. Such an arrangement may be referred to as a hollow core fibre with a 19 cell core.

In the fibre or cane structure, the ring of cells 22 immediately surrounding the core 26 is designated as a first ring, and the innermost walls or struts of the cells in the first ring form the boundary between the core 26 and the cladding 24. Owing to the hexagonal nature of the cell array, the first ring comprises six corner cells 30, one at each of the corner positions of the original hexagonal void left by the excluded cells. The six corner cells are separated by side cells 32. In the FIG. 2 example, the first ring comprises a total of 18 cells, and each corner cell 30 is spaced from its neighboring corner cells by two intermediate cells, designated as side cells 32. Hence, the first ring comprises six corner cells 30 and twelve side cells 32. Each of these first ring cells 30, 32, which might be considered as border or boundary cells, has a wall or strut that forms part of the core boundary 34 (the glass surface separating the core from the cladding), and the struts 27 of adjacent cells 30, 32 meet at nodes 28 spaced around the boundary. The core 26 is therefore bounded by 18 struts (one for each border cell) which are connected by 18 boundary nodes. These struts and nodes together form a continuous glass surface enclosing the hollow core 26.

These various features are relevant for defining the geometry and structure of fibres according to embodiments of the present disclosure. As will be appreciated, FIG. 2 shows an "ideal" or "undistorted" structure in which the core is not enlarged relative to the cladding, and the hexagonal geometry is preserved such that all struts 27 are approximately the same length and all nodes 28 are approximately equally spaced from their immediate neighbors; this applies both to the region of the cladding 24 around the core 26 (including the first ring) and the parts of the cladding 24 more remote from the core 26. As described herein, however, it is proposed that particular distortions are introduced so that the fibre structure deviates from this regular ideal structure. As will be demonstrated, defined distortions or departures from the idea structure can produce attractively low loss fibres.

Figure 3B:
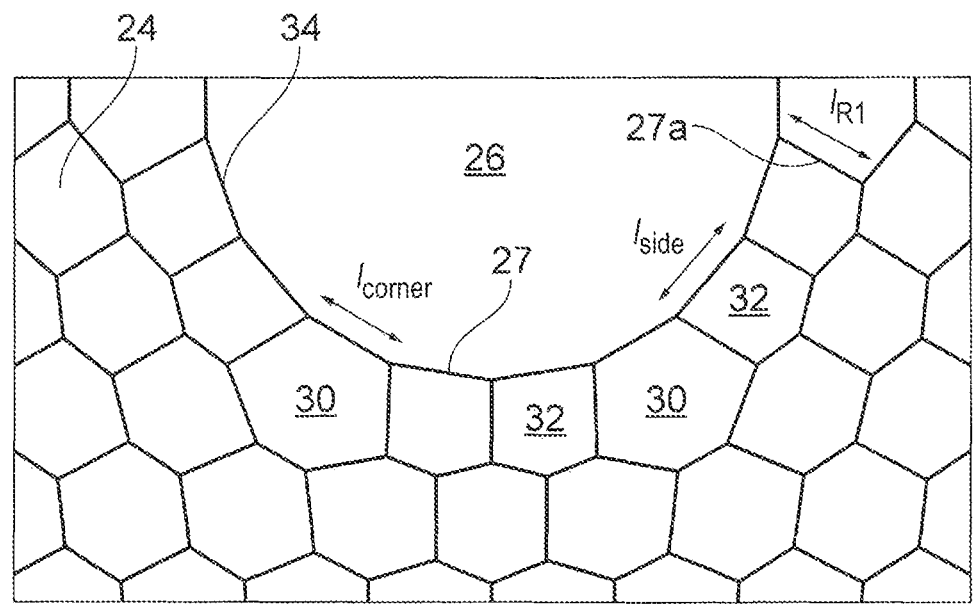

FIGS. 3A and 3B show cross-sectional schematic views of parts of a fibre, to illustrate parameters of interest which are used to define structural metrics of the fibres disclosed herein.

FIG. 3A shows a cross-sectional view of a lower half of a fibre 20. The fibre 20 comprises a cladding 24 with a plurality of cells in a hexagonal array, surrounding a central hollow core 26 formed, as before, by an excluded group of 19 cells. An outer jacket 14 surrounds the cladding 24.

The core 26 has a diameter $r_{core}$ and the cladding 24 has an outer diameter $r_{cladding}$. For convenience, these parameters can be measured using the standard cell width or diameter from an undistorted hexagonal array (ideal structure) as the unit of length.

FIG. 3B shows an enlarged portion of part of FIG. 3B, showing part of the core 26 and the immediately adjacent parts of the cladding 24. The first ring of cells comprises corner cells 30 spaced apart by two side cells 32, as described with reference to FIG. 2. Each cell in the first ring has a wall or strut 27 forming the boundary 34 of the core 26. The strut length along the boundary (i.e. along or around the core 26) for the corner cells 30 is designated as $l_{corner}$. The strut length along the boundary for the side cells 32 is designated as $l_{side}$. Also of interest is the length of the struts 27a that separate the cells 30, 32 of the first ring from each other. These struts 27a extend radially outwardly from the core; they are radially aligned. The length of these struts 27a in the first ring is designated as $l_{R1}$, where the "R" label indicates the radial nature of the struts (compared to the circumferential alignment of the struts along the core-cladding boundary) and the "1" label indicates the first ring. The strut lengths are used to define ratios (as described below), so the manner in which the length is defined is unimportant so long as a consistent measurement is used.

For example, the length of a strut might be measured from the centres of the two nodes between which the strut extends. Alternatively, it might be measured between two points at which the width of the strut thins to a defined value as the strut extends from a node; this will give a shorter strut length in which the nodes are not included.

These parameters are used to define a number of metrics for characterization of fibre structures, and in particular the amount by which a fibre structure deviates from the uniform ideal structure of the FIG. 2 example. The metrics therefore indicate a level of structural distortion in a fibre. These are discussed in more detail below.

Hollow core photonic bandgap fibres can be accurately modeled using computer modeling, for example to assess and compare the performance of differently structured fibres and the outcome of different fibre fabrication techniques. For example, a fluid dynamics numerical model designated as the Microstructure Element Method (MSEM) has been used by the present inventors [6]. This is known to be able to reproduce HC PBGF fabrication results extremely accurately. To demonstrate the accuracy and efficacy of this modeling, one can compare experimental results with the output of the model operating on the experimental parameters.

Figure 4:
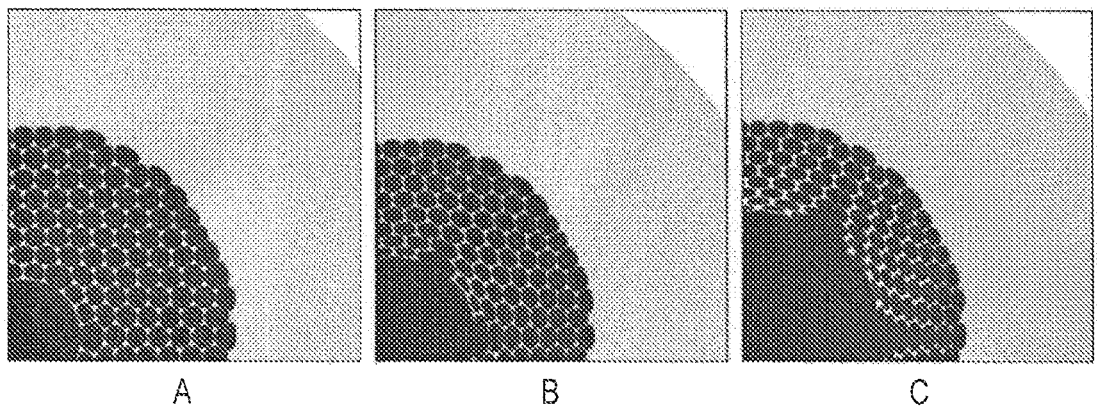
FIGS. 4A-4C show cross-sections of example optical fibres fabricated in accordance with a known method.

FIGS. 4A, 4B and 4C show cross-sectional views of parts of fibres produced by prior experiments in which the core region was artificially inflated by application of pressure during the fibre drawings with an aim of reducing optical loss [6]. FIG. 4A shows a standard, undistorted structure with a core size corresponding directly to the exclusion of 19 central cells. FIGS. 4B and 4C show fibres produced by increasing the pressure applied to the core during fabrication, to enlarge the core diameter. The pressure for the FIG. 4C fibre was larger than for the FIG. 4B fibre, which was in turn larger than for the FIG. 4A fibre. All other draw parameters were kept constant. As expected, the core is enlarged in the FIGS. 4B and 4C fibres, but severe distortions appear in the cladding, particularly in the cells of the rings closest to the core. The first ring in particular becomes squashed in the radial direction, and the spacing between the nodes around the core becomes uneven. These factors increase the fibre loss.

Figure 5:
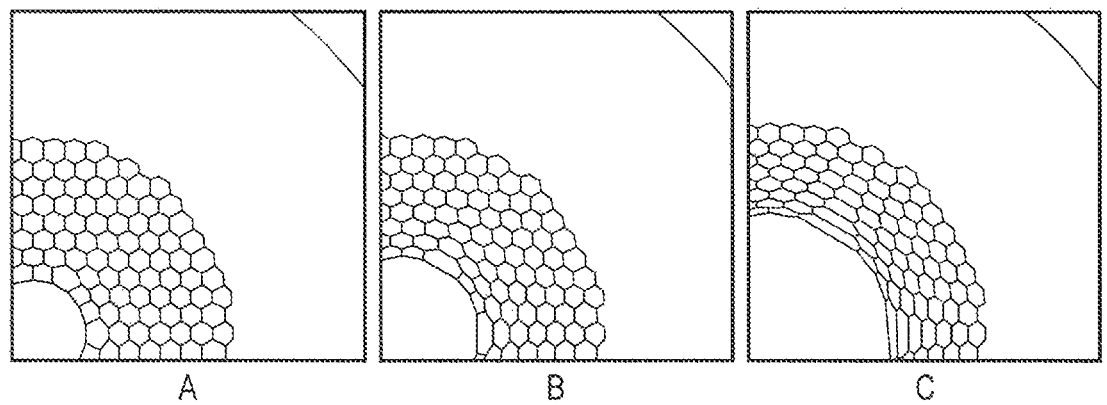
FIGS. 5A-5C show cross-sections of modeled fibre structures corresponding to the examples fibres in FIGS. 4A-4C.

FIGS. 5A, 5B and 5C show simulated fibres, obtained by modeling using the experimental parameters used to fabricate the fibres of FIGS. 4A, 4B and 4C. As can be seen, the simulated fibres have a near-identical structure to the experimental fibres, indicating that the modeling produces valid results. The model allows exploration of fibre structures than can be obtained from a given preform structure for any set of draw parameters, including any combination of pressures applied to the voids and cells of the core and cladding during the drawing process. This structural modeling can be combined with a modal finite element method (FEM) analysis of the fibre structure to generate accurate information about the optical transmission loss of a modeled fibre [7, 10].

As noted, structural distortions relating to optical loss include compression of the cells in the first ring surrounding the core, and the nodes around the core becoming unevenly spaced. To analyze these features and their impact of fibre loss, some structural metrics are defined, using the measurements depicted in FIGS. 3A and 3B.

Core size ratio: This is defined as the ratio between the core diameter $r_{core}$ and the cladding diameter $r_{cladding}$ (so, $r_{core}/r_{cladding}$), normalized to the same ratio in an idealized structure, $n_{core}/n_{cladding}$. So, for the FIG. 3A example, the ratio of the idealized structure is the ratio of the core diameter $n_{core}$ of 5 cells (the width of a 19 cell core) to the cladding diameter $n_{cladding}$ of 19 (the core width of 5 plus two times seven cells from the surrounding seven rings of the cladding). So, core size ratio=$(r_{core}/r_{cladding})/(n_{core}/n_{cladding})$ Accordingly, in a fibre with an enlarged core, the core size ratio is greater than one. For an idealized fibre, the core size ratio is approximately equal to one.

Core node spacing: This is defined as the ratio between the strut length $l_{corner}$ of the largest corner cell in the first ring of cells around the core and the strut length $l_{side}$ of the smallest side cell in the first ring. The length of a strut at the core boundary indicates the distance by which adjacent boundary nodes are spaced. So, core node spacing=max($l_{corner}$)/min($l_{side}$)

Accordingly, the core node spacing indicates the level to which the node spacing in the first ring is distorted. In the idealized fibre structure, the node spacing of the first ring is preserved as a constant and the core node spacing is approximately equal to one. In the distorted fibre structures of the FIGS. 4B and 4C examples, the corner cells are stretched, and the core node spacing is greater than one.

First ring ratio: This is defined as the ratio between the mean (or average) length $l_{R1}$ of the radially aligned struts in the first ring of cells around the core (i.e. the struts separating the first ring cells from one another) and the length of a strut in an undistorted hexagonal array of an idealized structure with a core size ratio of one (where this strut length is the length of a side of a hexagon in the hexagonal array). So, first ring ratio=mean($l_{R1}$)/($r_{cladding}/0.75 \times n_{cladding}$)

Accordingly, the first ring ratio indicates the level to which the first ring is squashed or flattened, for example as the core inflates. In the idealized fibre structure the first ring is not compressed and the first ring ratio is approximately equal to one. In the distorted fibre structures of the FIGS. 4B and 4C examples, the first ring is squashed and the first ring ratio is less than one.

In summary, therefore, an undistorted hexagonal fibre structure such as that shown in FIG. 4A has approximately core size ratio=1, core node spacing=1 and first ring ratio=1. In contrast, the partially distorted structure of the FIG. 4B example has core size ratio=1.60, core node spacing=2.30 and first ring ratio=0.60, while the highly distorted structure of FIG. 4C has core size ratio>2, core node spacing≈3 and first ring ratio<0.5. As noted, these structural distortions tend to contribute to optical transmission loss.

Figure 6:
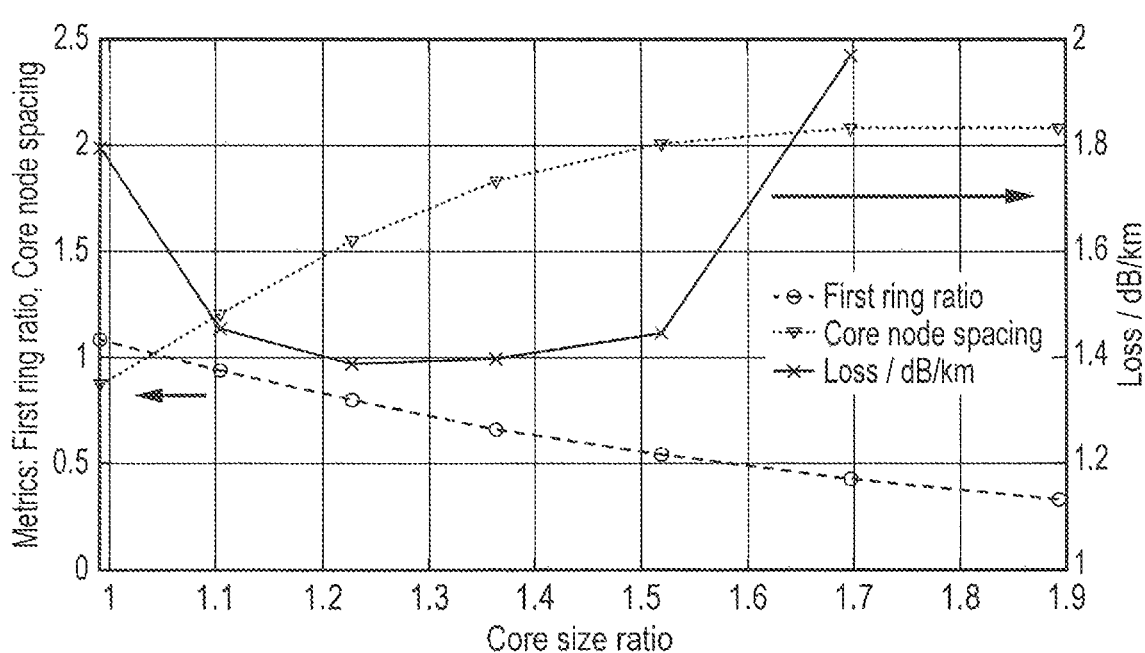
FIG. 6 shows a graph of the variation of optical loss and first ring ratio and core node spacing metrics with a core size ratio metric for optical fibres fabricated by a first known method.

FIG. 6 presents a graph showing how the first ring ratio and the core node spacing metrics and the resulting optical loss evolve as the core size of the fibre is increased (similar to the experiment shown in FIGS. 4A-4C). The core size ratio is increased from 1.00 to 1.90 and plotted on the x-axis, while the first ring ratio and core node spacing are shown on the left-hand y-axis and the loss in dB/km at a wavelength of 2000 nm (2 μm) is shown on the right-hand y-axis. The fibre material is assumed to be silica, and the fibre has a 19-cell core and 7 rings of cladding cells in this example. The fibre is assumed to be fabricated using a conventional two-pressures method, in which, during the fibre draw, a first pressure is applied to the core void and a second lower pressure is applied to the voids/cells of the cladding.

An increasing core size gives an increased core size ratio. As can be appreciated from FIG. 6, as the core diameter expands, the core node spacing also increases (dotted line) and the first ring ratio decreases (dashed line). This has the result that, despite the larger core which might be expected to lead to lower loss, only a small decrease in loss is achieved, followed by an increased loss for larger core sizes. The loss is shown by the solid line, and can be seen to decrease marginally from a value of 1.8 dB/km for a conventional regular fibre structure (core size ratio of one) to a value of 1.4 dB/km for a core size ratio just above 1.20, before increasing again at larger core size ratios as the effects of the structural distortions become more significant. A core size ratio above about 1.50 results in a rapid increase of loss. Thus, for this preform structure, draw conditions and fibre core expansion, 1.4 dB/km is the minimum loss value achievable with the conventional two-pressures fibre fabrication technique.

WO 2015/040189 [9] describes a fibre fabrication technique in which, in addition to separate pressurization of the core and the cladding, a further pressure is applied to the corner cells of the first ring. This is carried out with the aim of preserving a uniform core node spacing, to reduce distortion and hence improve the loss characteristic. However, if core node spacing is controlled to be uniform (i.e. equal to one) by use of a pressure differential for the corner cells, the first ring is compressed so that first ring ratio reduces as the core size increases. The resulting reduction in loss is minimal.

Figure 7:
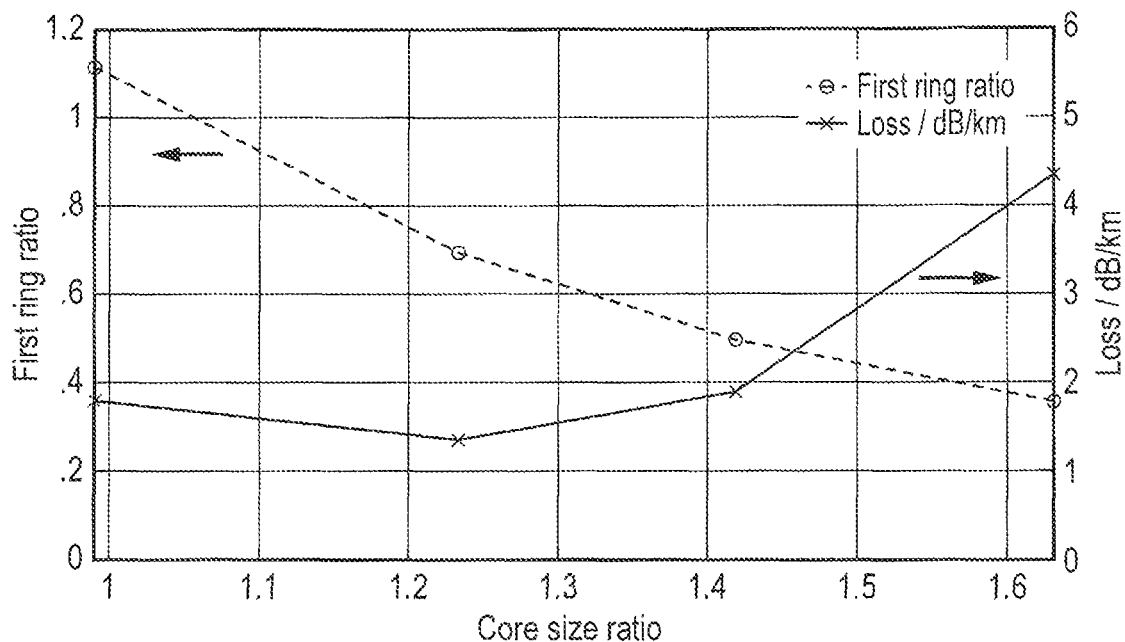
FIG. 7 shows a graph of the variation of optical loss and first ring ratio with core size ratio for optical fibres fabricated by a further known method.

FIG. 7 presents a graph showing the loss values for fibres fabricated according to the method of WO 2015/040189 [9]. Aside from the different pressurization regime, other fibre and fabrication parameters are the same as for the FIG. 6 graph. FIG. 7 shows, across a core size ratio range of 1.00 to 1.70, and a constant core node spacing of one, the variation of the first ring ratio (left-hand y axis) and the loss (right-hand y-axis). From this it is apparent that, while the loss does initially decrease with an increasing core size ratio, it then increases again as before. The minimum achievable loss is about 1.3 dB/km, at a core size ratio of 1.25. This is only a minor improvement of the loss achievable in the FIG. 6 scenario.

In contrast, the present disclosure teaches that a further and more significant reduction in optical transmission loss can be achieved if one takes into account both the core node spacing and first ring ratio while the core size ratio is increased. If the core size is increased while maintaining the structure of the neighboring parts of the cladding (specifically the first ring) close to the desired optimum undistorted structure of a core node spacing of approximately one and a correctly proportioned first ring ratio of approximately one, fibres having low optical loss can be produced. Where fabrication of such a fibre structure is not possible using conventional and known pressurization techniques, a more sophisticated pressurization arrangement has been found to be able to produce fibres of the desired structure, using a hexagonal array of cells in the cladding.

In particular, it is proposed that during fibre drawings, four pressures are provided for independent and separate pressurization of different parts of the fibre. These are A first pressure applied to the core void.
A second pressure applied to each of the six corner cells or voids in the first cell ring surrounding the core.
A third pressure applied to each of the side cells or voids in the first cell ring surrounding the core (i.e. the cells between the corner cells, of which there are twelve in a fibre with a 19 cell core).
A fourth pressure applied to the remaining cladding cells or voids, i.e. the cladding cells of the second and subsequent rings surrounding the core.

To demonstrate this, the MSEM has been used to model the drawing of a range of fibres from a preform having the same characteristics as the FIG. 6 example fibres, but to which the above-defined first, second, third and fourth pressures are applied. In particular, the capillaries are hexagonally stacked, the core comprises a central group of 19 excluded capillaries, and the cladding comprises six rings of capillaries surrounding the core. The draw conditions were also the same as for FIG. 6.

The first, second, third and fourth pressures were carefully chosen for each fibre to produce drawn fibres with a core node spacing of approximately one (known from WO 2015/040189 [9] to contribute to low loss) but with varying values of core size ratio and first ring ratio.

Figure 8:
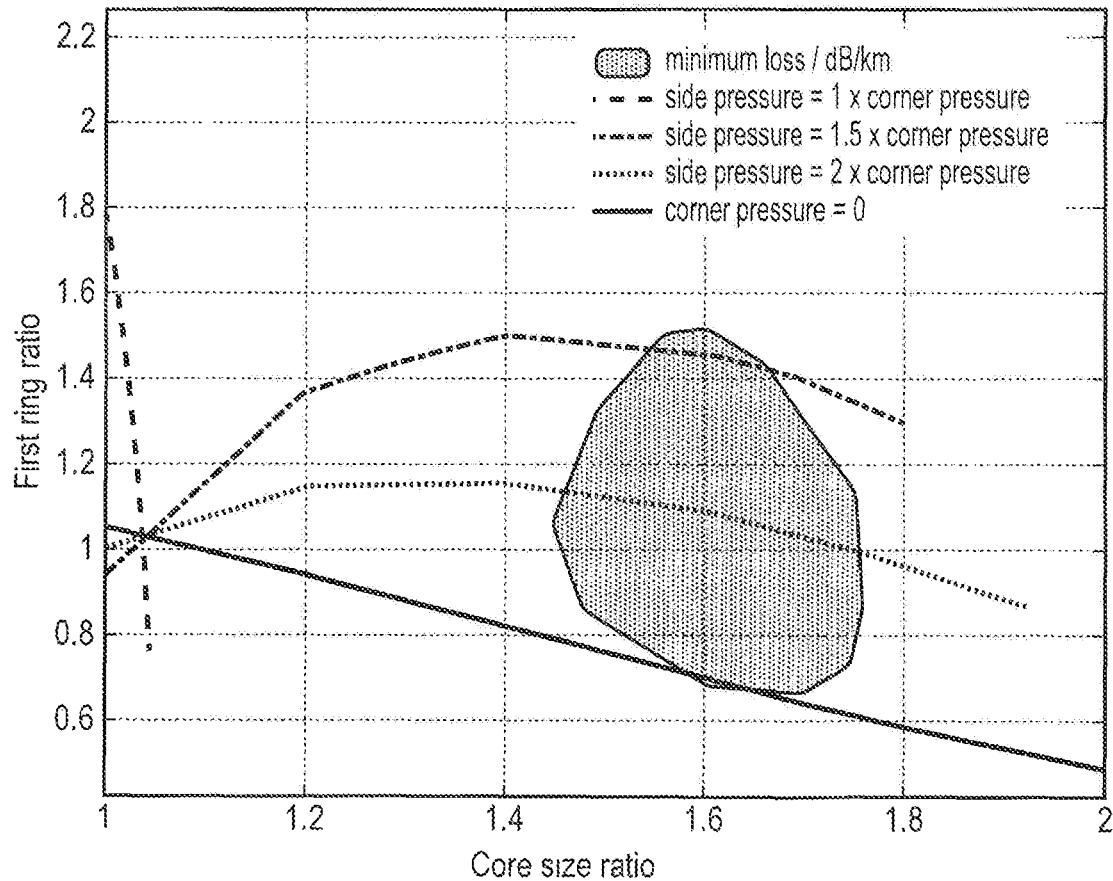
FIG. 8 shows a map of optical loss for varying core size ratio and first ring ratio for example optical fibres fabricated according to a present example method.

FIG. 8 shows a "loss map" plot of results from this analysis, in which core size ratio and first ring ratio are indicated for selected values of loss. The shaded area represents fibres with a loss value at 2 µm of less than 1 dB/km, with the outline of the area indicating loss equal to 1 dB/km. Outside this shaded area the loss is above 1 dB/km, and inside the shaded area values below 1 dB/km can be achieved, but precise values are not indicated on the graph for simplicity. The extent of the shaded area indicates that to achieve a loss of 1 dB/km or below, a fibre should have a core size ratio between about 1.45 and about 1.75, and a first ring ratio between about 0.70 and 1.50, with a core node spacing (not shown on the plot since it was kept constant for all fibres) of about 1.00.

Hence, fibres with structural metrics in these ranges can be expected to have a loss significantly lower than for fibres made using known techniques: 1 dB/km or less compared to 1.3 or 1.4 dB/km.

Figure 9:
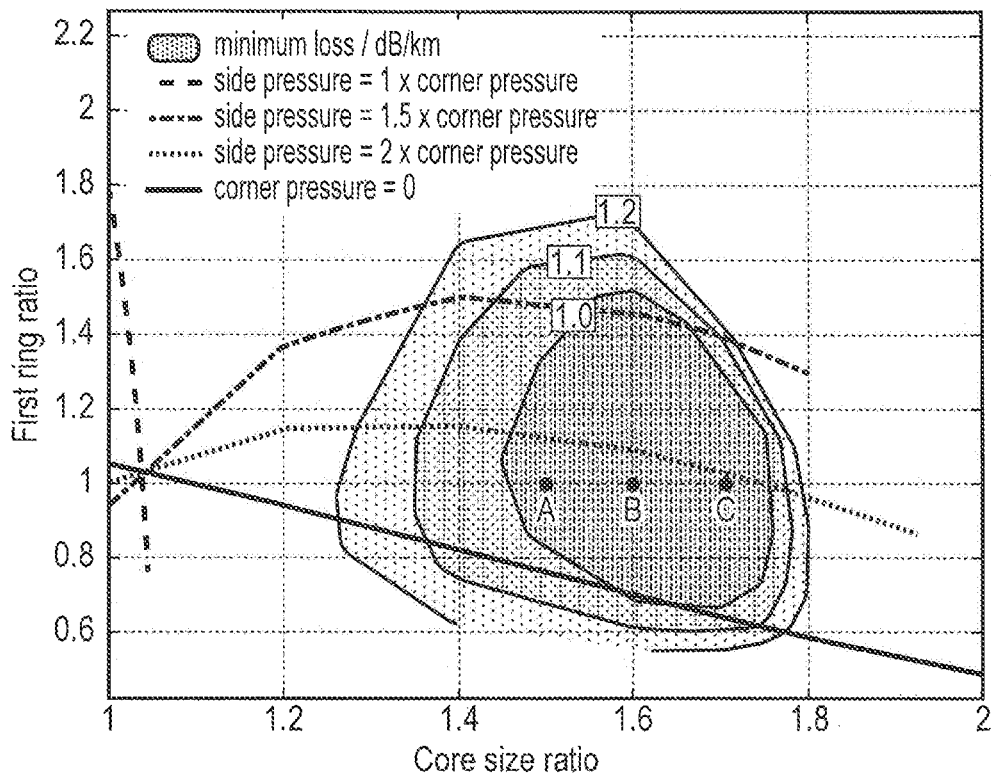
FIG. 9 shows a further map of optical loss for varying core size ratio and first ring ratio for example optical fibres fabricated according to a present example method.

FIG. 9 shows a further loss map plot, with the information from FIG. 8 supplemented with additional data. In particular, two further low loss regions are indicated. A region or area encompassing fibres with loss at 2 µm of 1.1 dB/km and below is shown; this includes the previous 1 dB/km area. A further region encompassing fibres with loss of 1.2 dB/km and below is also shown, which includes the two previous areas. As can be seen, to achieve a loss of 1.1 dB/km or less, a fibre should have a core size ratio between about 1.35 and about 1.78 and a first ring ratio between about 0.60 and about 1.60 (for a core node spacing of about 1.00). To achieve a loss of 1.2 dB/km or less, a fibre should have a core size ratio between about 1.27 and about 1.80 and a first ring ratio between about 0.56 and about 1.70 (for a core node spacing of about 1.00).

As can be understood from FIG. 9, values of core size ratio and first ring ratio within smaller ranges centered around roughly 1.60 for the core size ratio and 1.10 for the first ring ratio will yield fibres with a loss less than 1 dB/km. For example, the core size ratio might be chosen to be between 1.50 and 1.70, or between 1.55 and 1.65, and the first ring ratio might be chosen to be between 0.90 and 1.30, or between 1.00 and 1.20.

Of particular interest are fibres within the 1.1 dB/km or less loss region, since loss performance of 1.1 dB/km or below is a significant improvement on the previously reported loss values for HC-PBGF noted above. However, fibres with larger loss values, within the 1.2 dB/km or less region, are still of value.

To achieve a fibre structure falling with the shaded low loss regions of FIGS. 8 and 9, the first, second, third and fourth pressures should be appropriately selected. For the simulated fibre sets represented in FIGS. 8 and 9, the cladding pressure (fourth pressure) was kept uniform for all fibres, while the first (core), second (corner cells) and third (side cells) were varied relative to the fourth pressure. All pressure values presented are relative to that fourth pressure. FIGS. 8 and 9 show some pressure information pertinent to the desired low loss fibre structures. In particular, lines are shown for various pressure relationships. The solid line represents a corner pressure (second pressure) of zero; all parts of the plots above this line correspond to a side pressure greater than a corner pressure. Note that this line skims the lowest point of the 1 dB/km low loss region, so that for all fibres of 1 dB/km or below and most fibres of 1.1 and 1.2 dB/km or below, the side pressure should exceed the corner pressure. This is reiterated by the dashed line which represents equal pressures for the side cells and the corner cells, and clearly lies very remote from the low loss regions. Increasing the side pressure compared to the corner pressure improves the resulting structure; this is apparent from the dotted line showing a side pressure two times the corner pressure, which passes through the centre of the low loss regions. A side pressure of 1.5 times the corner pressure is shown by the dot-dash line which is near with the upper limit of the 1.0 dB/km region, indicating that lower comparative side pressures are less useful for achieving a desired low pressure. Accordingly, it is proposed that the side pressure exceeds the corner pressure, is usefully in excess of 1.5 times the corner pressure, and more usefully, is about two times the corner pressure.

In addition, the side pressure should be higher than the cladding pressure, and also the corner pressure should be higher than the cladding pressure. In summary, therefore, it is proposed that fibre drawing be carried out with a pressure regime in which cladding pressure<corner pressure<side pressure, and all four of the cladding, core, side and corner pressures are controlled separately.

Additionally, the core pressure should be less than the cladding pressure. The core has a tendency to expand more than the capillaries owing to its larger size and corresponding lower surface tension forces acting on it, so it is not necessary to apply a higher pressure to the core than to the various capillary cells to achieve core size inflation. Therefore, the complete pressure regime is defined as core pressure<cladding pressure<corner pressure<side pressure. In other words, first pressure<fourth pressure<second pressure<third pressure, or third pressure>second pressure>fourth pressure>first pressure. The highest pressure is applied to the side cells of the first ring, and the lowest pressure is applied to the core space.

The absolute values required for each of the four pressures will depend on the preform or cane structure (number of capillaries, capillary wall thickness, core size, etc.) and the draw parameters (temperature, melting point of the glass, drawing speed, etc.). The skilled person will be able to select appropriate values that fall within the pressure relationships proposed herein to achieve a required fibre structure for a loss of 1 dB/km or less, 1.1 dB/km or less or 1.2 dB/km or less.

Returning to FIG. 9, three specific fibre structures are indicated at points A, B and C. All fibres have a first ring ratio of 1, and a core size ratio of 1.50, 1.60 and 1.70 respectively. Table 1 gives the relative pressure values used to produce these fibres, compared to the cladding pressure which was maintained constant for all modeling. Hence, the core pressure values are negative, as being less than the cladding pressure, while the corner and side pressures values are positive, being greater than the cladding pressure, in accordance with the pressure relationship given above.

TABLE 1

|  | Fibre A | Fibre B | Fibre C |
| --- | --- | --- | --- |
| Core pressure | −1.8 kPa | −1.2 kPa | −0.6 kPa |
| Corner pressure | 0.7 kPa | 1.0 kPa | 1.3 kPa |
| Side pressure | 1.9 kPa | 2.2 kPa | 2.6 kPa |
| ΔP (side − core) | 3.7 kPa | 3.4 kPa | 3.2 kPa |

As with the absolute values, the pressure differentials between the core, cladding, corner cells and side cells will depend on the preform and the draw parameters, and the desired structure of the finished fibre, i.e. where each of the metrics falls within the defined ranges. The skilled person would again be able to select appropriate values to produce the required finished fibre.

Table 1 also shows the maximum pressure differential ΔP for each fibre, being the difference between the lowest pressure applied (the core pressure) and the highest pressure applied (the side pressure). As can be seen, the pressure differential is similar for each fibre, with Fibre A having differential of 3.7 kPa, Fibre B having a differential of 3.4 kPa and Fibre C having a differential of 3.2 kPa. Since these example fibres are distributed across the 1 dB/km or less loss region, we can conclude that a useful range of pressure differential (difference between the maximum and minimum pressures applied) to achieve this level of loss can be considered to be from 3.0 to 4.0 kPa. Differentials outside this range are not excluded, however; for example the pressure differential may be chosen to be from 2.8 to 4.2 kPa, or 2.5 to 4.5 kPa, or 2.0 to 5.0 kPa, or 2.0 to 4.0 kPa, or 3.0 to 5.0 kPa. A differential falling within one of these ranges may be appropriate for a fibre with a loss value between 1.0 and 1.2 dB/km, for example. Further, a smaller range might be useful in some cases, such as a differential between 3.2 kPa and 3.8 kPa, or between 3.4 kPa and 3.6 kPa, or between 3.0 and 3.5 kPa or between 3.5 kPa and 4.0 kPa.

The pressure relationships proposed for obtaining low loss HC PBGFs in the target zones of 1.2, 1.1 or 1 dB/km or below may be summarized as:

Four independent pressures, applied respectively to the core, the corner cells, the side cells and the remaining cladding cells.

The side cell pressure is greater than the cladding cell pressure.

The corner cell pressure is greater than the cladding cell pressure.

The side cell pressure is greater than the corner cell pressure.

The side cell pressure may be greater than 1.5 times the corner cell pressure.

The side cell pressure may be about two times the corner cell pressure.

The core pressure is less than the cladding cell pressure.

A very low optical loss such as that attainable by the proposals herein is most useful when coupled with at least a moderate transmission bandwidth. Fibres in the 1 dB/km or below low loss region shown in FIGS. 8 and 9 have a bandwidth of 100 nm or greater, which is considered more than adequate for most applications of HC PBGFs.

Figure 10:
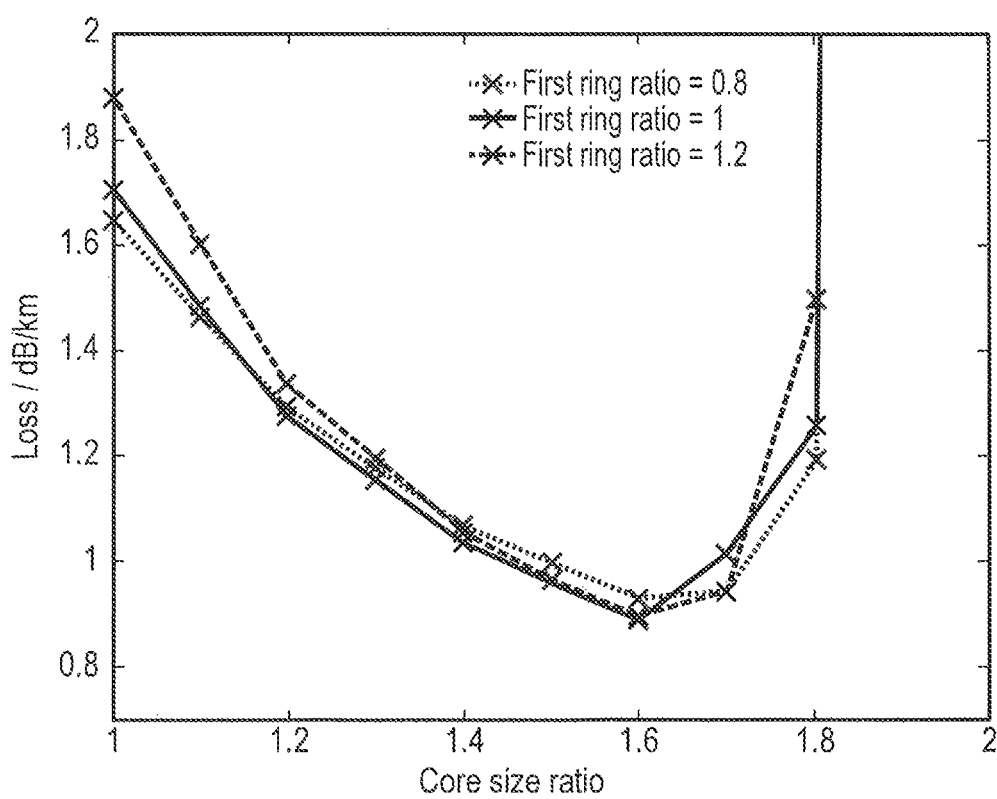
FIG. 10 shows a graph of the variation of optical loss with core size ratio for example fibres from the FIG. 8 map.

FIG. 10 shows a graph of loss at 2 μm per dB/km plotted against core size ratio for a range of first ring ratio values, to further illustrate the low losses which can be achieved. The lines, dotted for a first ring ratio of 0.80, solid for a first ring ratio of 1.00 and dashed for a first ring ratio of 1.20, are sections through the loss map of FIG. 8. Comparison with the graphs of FIGS. 6 and 7 for conventionally fabricated fibres shows the significant additional loss reduction that can be achieved by controlling pressure to control the first ring parameters when the core is increased in size. The lines indicate that for this range of first ring ratio, i.e. from 0.80 to 1.20, a loss of 1 dB/km or below corresponds to a core size ratio range of about 1.45 to about 1.72. Within these ranges, a minimum loss of 0.9 dB/km can be achieved.

Compare the lower end of the core size ratio ranges herein (1.45 from FIGS. 8 and 10; 1.27 and 1.35 from FIG. 9) to the maximum core size ratio of about 1.25 advised in WO 2015/040189 which proposes control of only three pressures; a larger (in many cases much larger or very much larger) core size ratio is proposed herein to achieve a lower loss than previously achievable.

It will be apparent that for the fibres considered thus far, beyond the core size range of interest (for example for a core size ratio of above about 1.80), a rapid increase in loss occurs. This is because the cladding is now very compressed to accommodate the large core diameter, giving insufficient distance between the core where the light is guided, and the outer solid glass jacket. In turn this causes optical confinement or leakage loss; hence the increasing loss at large core size ratio values seen in FIG. 10. However, this is not a critical issue, and can be mitigated by adding further rings of cladding cells (recall that the examples thus far have been restricted to six rings of cladding cells). This extra volume of cladding allows the core to be expanded further, which can be shown to give further benefits in terms of loss reduction.

Figure 11:
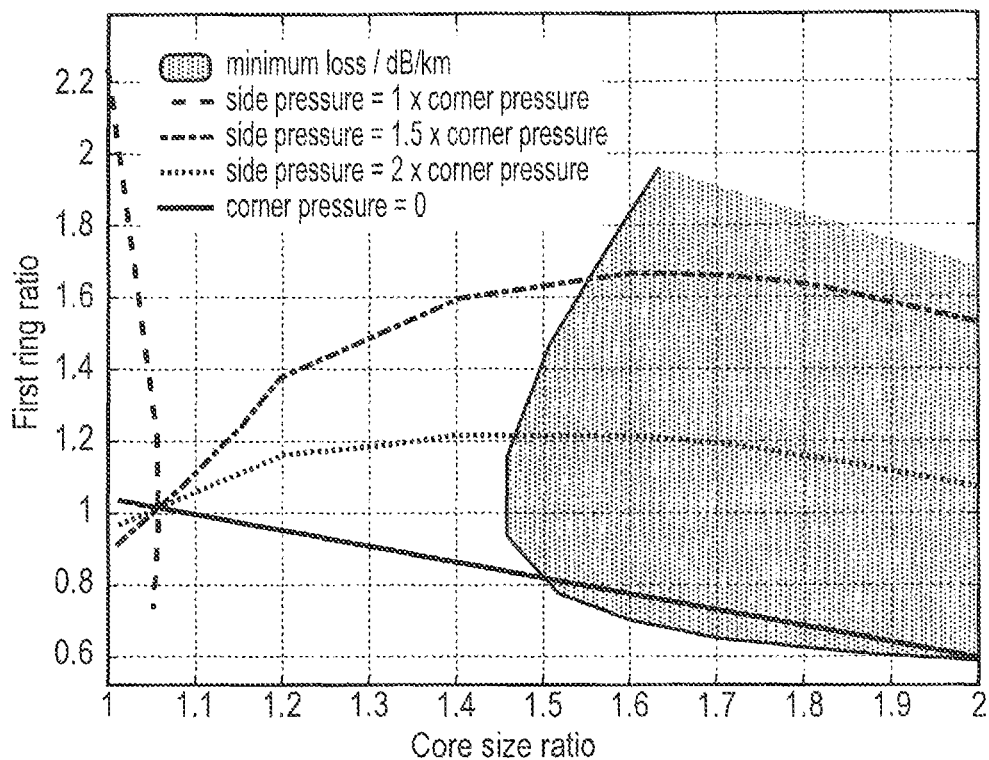
FIG. 11 shows a map of optical loss for varying core size ratio and first ring ratio for alternative example optical fibres fabricated according to a present example method.

FIG. 11 shows a loss map plot similar to that of FIG. 8, but for larger diameter fibres having nine rings of cells around a 19 cell core, instead of six rings. Again, a low loss region of loss at 2 µm of 1 dB/km or less is shown as a shaded area. This lies in a range of core size ratio above about 1.45 and a first ring ratio above about 0.60; these are similar values to the smaller fibres. However, the low loss region extends to larger values for the first ring ratio, up to 1.80 and above, and significantly larger core size ratios of 2.00 and greater.

Dotted and dashed lines on FIG. 11 show that the pressure regime and relationships between the four pressures is similar to that required for the smaller, six ring fibres. Hence, the pressure relationships set out herein are considered to be widely applicable to fibres with different numbers of cladding rings.

Figure 12:
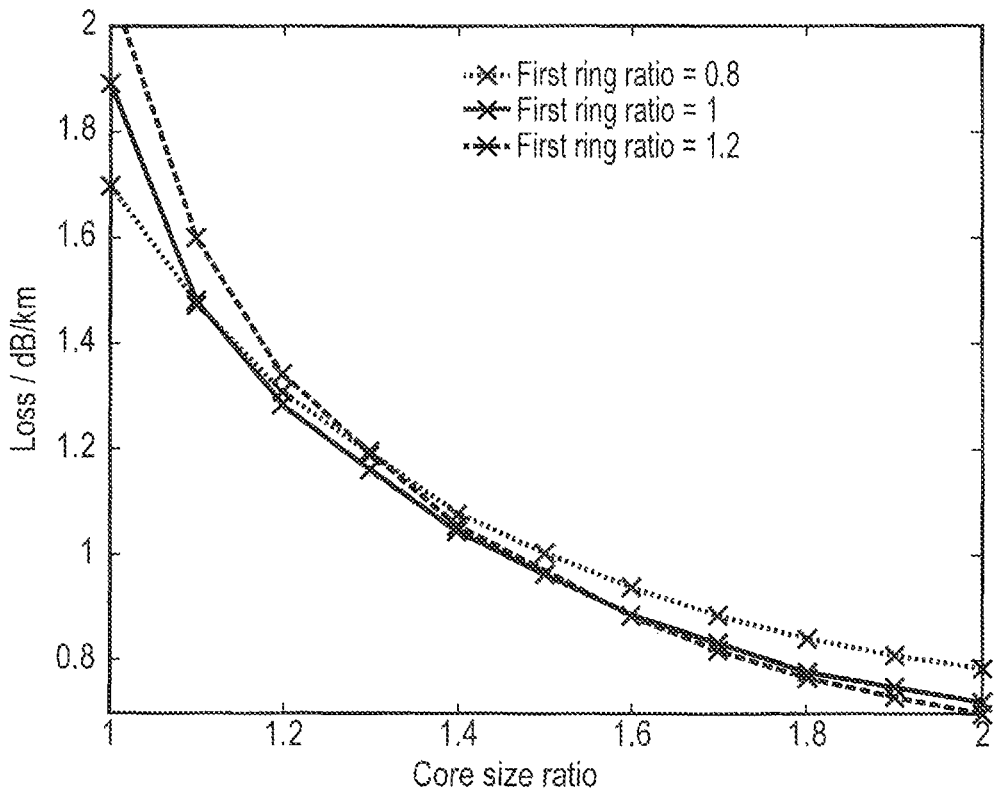
FIG. 12 shows a graph of the variation of optical loss with core size ratio for example fibres from the FIG. 11 map.

FIG. 12 shows a graph of loss at 2 µm against core size ratio for different first ring ratios (0.80 to 1.20) for the larger, nine ring fibres. From this it can be appreciated that further loss reductions can be obtained. A loss approaching as low as 0.7 dB/km can be attained for a core size ratio of 2.00 and a first ring ratio of 1.20 or higher. Even at the lower first ring ratio values of 0.80 and 1.00, the loss is lower than for the six ring fibres, being 0.8 dB/km or less, compared to the 0.9 dB/km for the six ring fibres (see FIG. 10).

Similarly, numbers of rings of cells around the core can be chosen to be other than six or nine. Intermediate values of seven or eight concentric rings of cells around the core can be used to achieve the same or similar results for loss for the same or similar values of the various metrics. Further, a smaller cladding of only five concentric rings of cells around the core can be used. In all cases, the core is formed as a 19 cell core, corresponding to an excluded group of 19 cells as described above.

For the examples discussed above, it has been noted that core node spacing has a value of about 1.00 (for example, in the FIGS. 8 and 9 values, the models used a core node spacing equal to 1), since this corresponds to the lowest loss. However, a range for the core node spacing that is near 1 can be used while still achieving a desirably low loss fibre. This might be useful if control of the four pressures to yield a core node spacing near 1 can be achieved more easily for a particular fabrication regime than pressure control to obtain an exact core node spacing of 1. A degree of design flexibility for fibre fabrication is thereby afforded.

Figure 13:
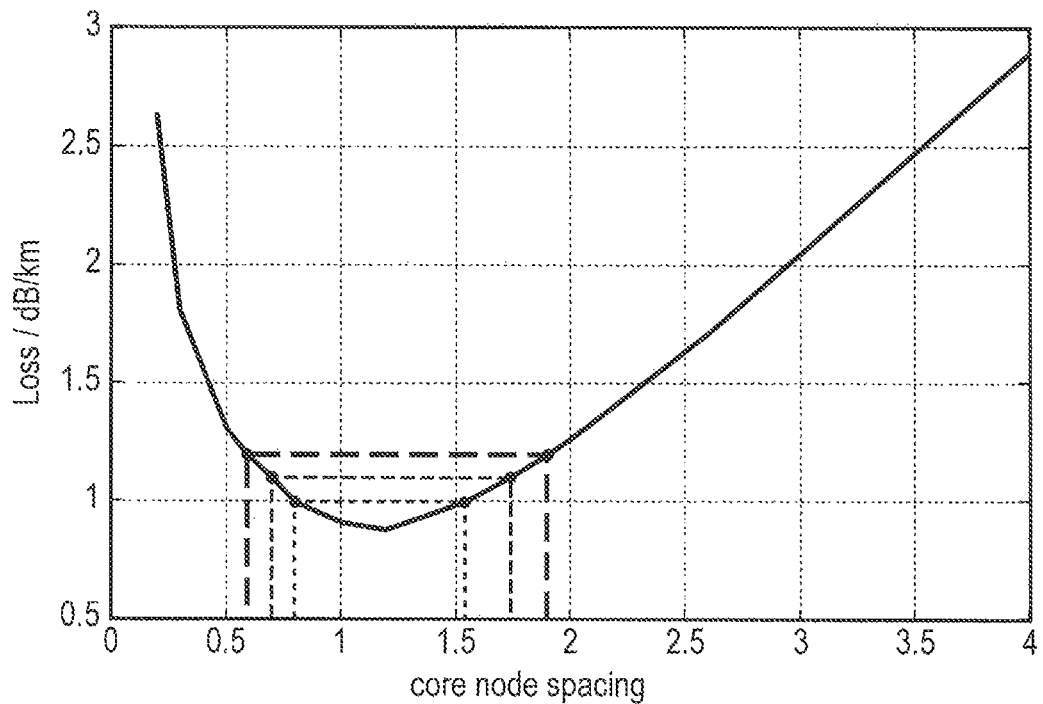
FIG. 13 shows a graph of the variation of optical loss with a core node spacing for example optical fibres fabricated according to a present example method.

FIG. 13 shows a plot of the variation of optical loss (attenuation) at 2 µm in dB/km with core node spacing, for a wide range of spacing values corresponding to very small corner cells (low core node spacing) to very large corner cells (high core node spacing). The other metrics match the lowest loss point from the data presented in FIG. 8, which is a core size ratio of 1.65 and a first ring ratio of 1.22. As can be appreciated, varying the core node spacing over a large range has a significant impact on loss, but an attractively low loss can be obtained for a range of core node spacing values. Hence, it is not necessary to be too prescriptive about obtaining a precise core node spacing of 1.

The lowest loss for the selected metrics is about 0.88 dB/km, corresponding to a core node spacing of about 1.20. Consider also the low loss regions of particular interest indicated in FIGS. 8 and 9. These regions are bracketed in FIG. 13. For a loss of 1 dB/km or below, shown by a dotted bracket, the core node spacing range is about 0.80 to about 1.54. For a loss of 1.1 dB/km or below, shown by a short dashed bracket, the core node spacing range is about 0.70 to about 1.72. For a loss of 1.2 dB/km or below, shown by a long dashed bracket, the core node spacing range is about 0.60 to about 1.90.

Figure 14:
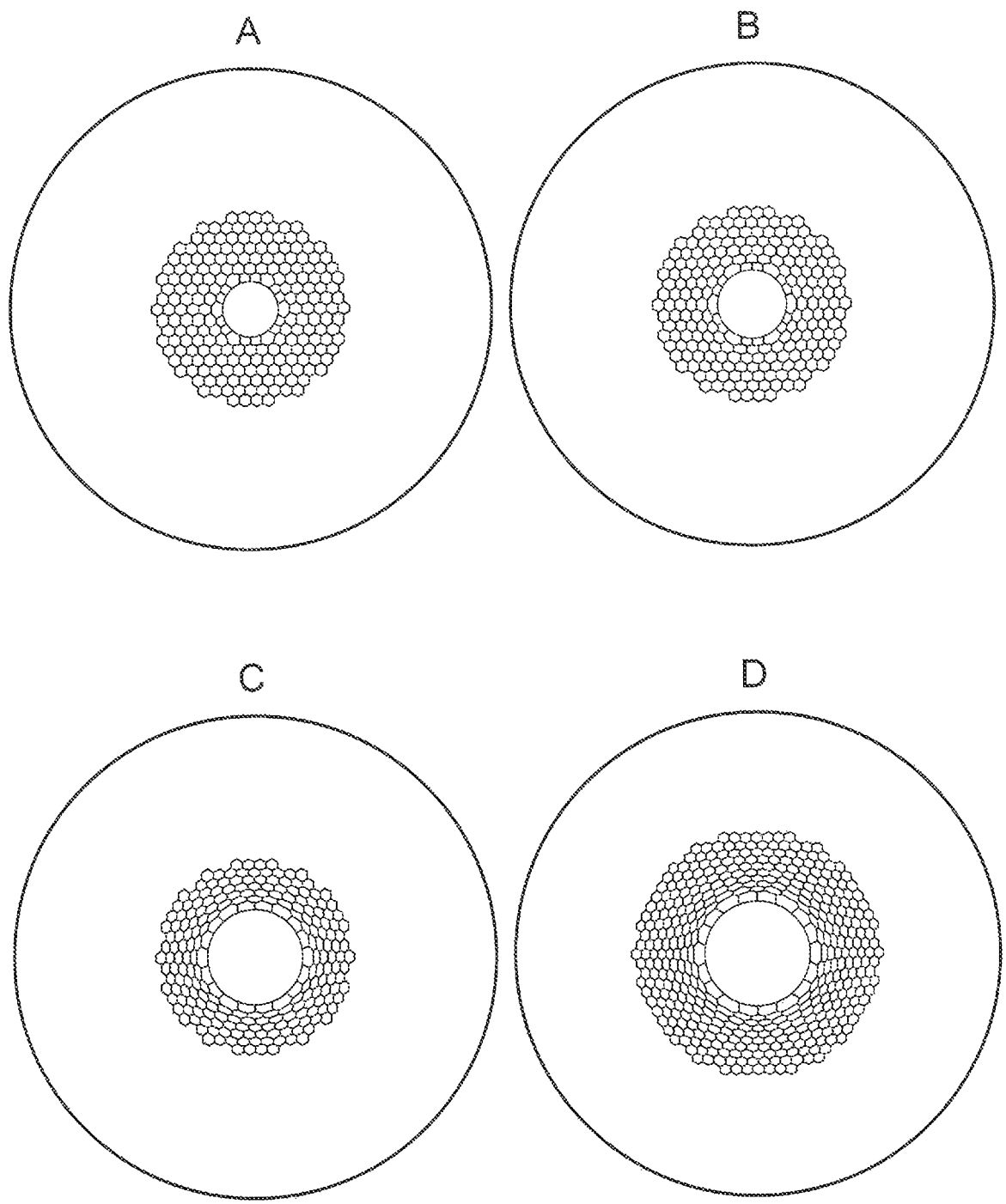
FIGS. 14A and 14B show cross-sectional views of modeled fibre structures fabricated according to known methods and FIGS. 14C and 14D show cross-sectional views of example modeled fibre structures fabricated according to present example methods.

FIG. 14 shows schematic representations of structures of various fibres fabricated by conventional techniques and those disclosed herein, as simulations from the computer modeling. The Figure shows cross-sectional views through the fibres, showing the central core surrounding by the microstructured glass cladding surrounded by a solid glass jacket.

FIG. 14A shows a standard "idealized" structure with little or no distortion (hence, core size ratio=1 and first ring ratio=1), comprising a 19 cell core surrounded by six rings of cells (plus some cells in a seventh ring, which improves circularity of the outer cladding surface). This fibre has a loss of about 2 dB/km. FIG. 14B shows the fibre with minimum loss that can be achieved with previous techniques. Again, the fibre has a 19 cell core with six cladding rings; note the slightly enlarged core compared to FIG. 14A. The loss is 1.4 dB/km, as noted above. FIG. 14C shows an optimum six ring fibre according to an embodiment herein, with a core size ratio of 1.70 and a first ring ratio of 1.20, and a low loss of 0.9 dB/km. Note the much larger core compared to FIG. 14B. FIG. 14D shows an optimum nine ring fibre according to an embodiment herein. Note that the core is larger still. The core size ratio is 2.00 and the first ring ratio is 1.20, producing a low loss of just 0.7 dB/km.

Figure 15:
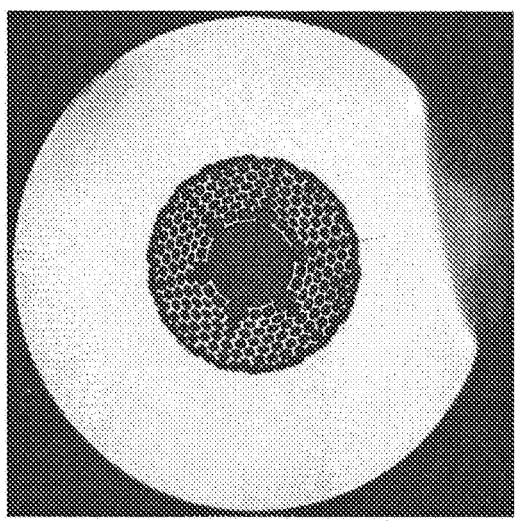
FIGS. 15A and 15B shows photographs of cross-sections of example optical fibres fabricated according to present example methods.
Figure 15:
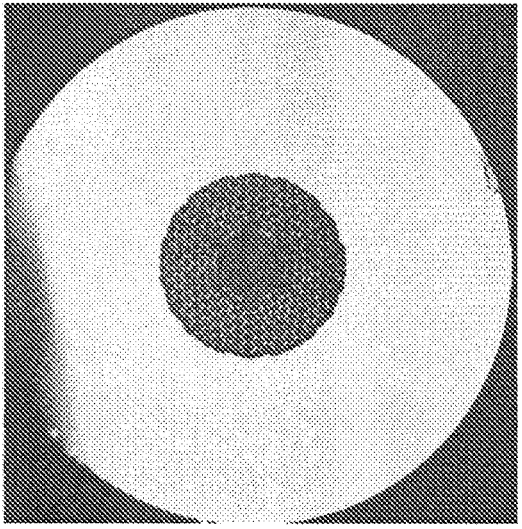

For illustration, FIG. 15 shows SEM images (end views) of two actual fibres fabricated using a four-pressure method. The fibres have an enlarged core with a core size ratio in the range 1.3 to 1.4, and a first ring ratio greater than 1. In particular, FIG. 15A shows a fibre with a core size ratio of 1.40, a core node spacing of about 2.4 and a first ring ratio of about 1.20. The fibre diameter (jacket outer diameter) is 207 µm. FIG. 15B shows a larger fibre of diameter 234 µm, with a core size ratio of 1.30, a core node spacing of about 2.7 and a first ring ratio of about 1.10. It is believed to not be possible to fabricate HC PBGF with an enlarged core (core size ratio greater than 1) and a first ring ratio greater than 1 using conventional fabrication techniques, in particular conventional core pressurization with the same pressure applied to all cladding capillaries. While the core node spacing values are larger than the particular ranges of interest in the present examples, these results demonstrate that a pressurization regime using four pressures can be used to manipulate the core surround region to both enlarge the core and provide a first ring ratio greater than one. Minor adjustment of the core, side and corner pressures can produce a core node spacing in the range of interest, namely between 0.60 and 1.90.

Figure 16:
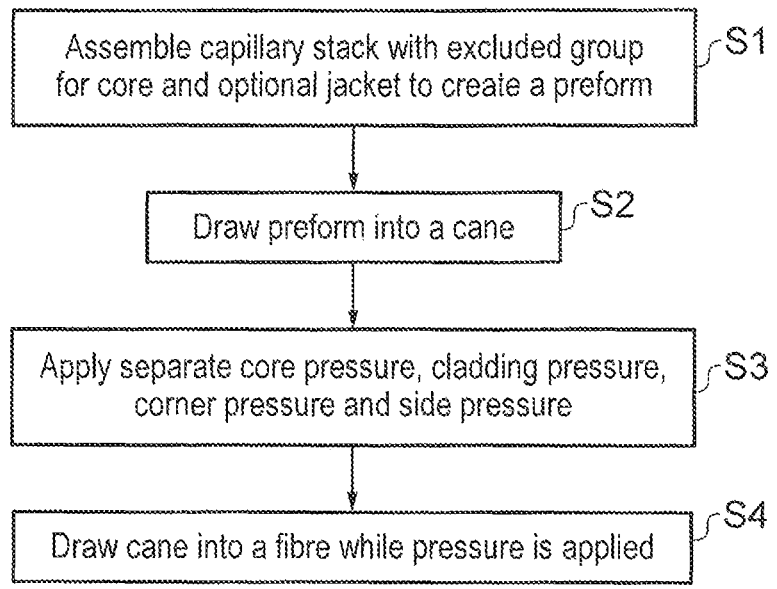
FIG. 16 shows a flow chart of steps in an example method for fabricating optical fibres.

FIG. 16 shows a flow chart of an example method for fabricating a fibre according to the present disclosure. In a first step S1, a preform is created by assembling the appropriate number of glass capillary tubes into a hexagonally arrayed stack. A group of 19 capillaries is excluded to make a void which will form the fibre core. Optionally, an additional and larger capillary, also called a core tube or core capillary, can be inserted into the void, having an outer diameter comparable to the width of the void. A jacket may be included around the stack, which may be intended as a component of the finished fibre or may be included for example to retain the stack in the required configuration and then removed at a later stage, or may be omitted. Other outer or jacket layers may be included at this or later stages as desired. In the next step S2, the preform is drawn or pulled into a smaller diameter cane, by the application of heat to soften the glass and tension or gravity to stretch the preform. In a third step, S3, pressure sources are connected to the cane to apply separate pressures to each of the core, the six corner cells, the side cells and the remaining cladding cells in accordance with the pressure relationship set out above: core pressure<cladding pressure<corner pressure<side pressure. Finally, in step S4, the cane is drawn down to the required size for the fibre, while the four pressures are maintained.

Note that this method is merely an example, and the required pressure differentials during drawing could be achieved differently. For example, the pressures might be applied to the preform, and the preform drawn directly into the fibre, omitting the intermediate cane stage.

Figure 17:
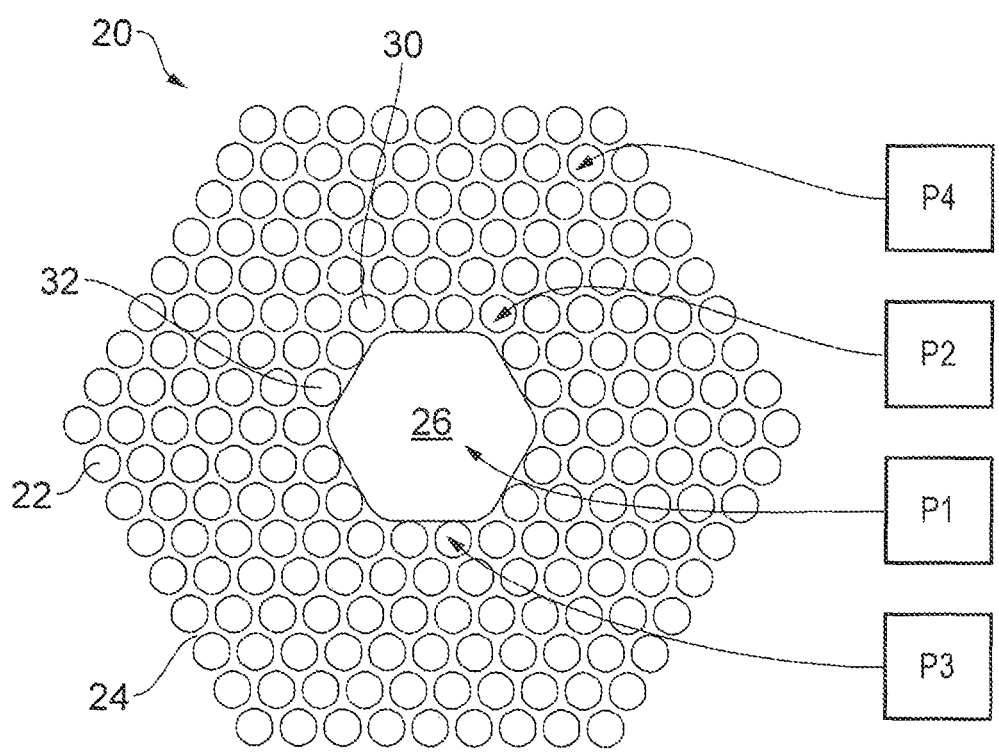
FIG. 17 shows a schematic representation of example apparatus suitable for carrying out the example method of FIG. 16.

FIG. 17 shows a schematic representation of example apparatus for performing a method for fabricating a fibre according to the present disclosure, such as the method of FIG. 16. A cane or preform 20 comprises a hexagonal array of cells or capillaries 22 forming a cladding surrounding a central hollow void or core 26. A jacket or other outer layer may surround the cane 20 (not shown). A first pressure source P1 is connected to apply a core pressure to the core 26. A second pressure source P2 is connected to the six corner cells 30 of the first ring surrounding the core 26. A third pressure source P3 is connected to the twelve side cells 32 of the first ring. A fourth pressure source P4 is connected to the remaining cells 22 of the cladding 24, that is, the cells 22 beyond the first ring. The pressure sources are operated to apply pressures in accordance with the required pressure relationship: core pressure<cladding pressure<corner pressure<side pressure. Hence, P3>P2>P4>P1. These pressures, which give pressure differentials between the various groups of the cells and the core, are maintained during drawing of the cane or preform 20 into the finished fibre.

While the pressures are illustrated as being applied to only one void/cell for each pressure source, this is for clarity only and in reality the pressure is applied to each void/cell in the relevant group, for example using techniques already known for applying differential pressure to the core and cladding while drawing a fibre.

One of the pressures could be atmospheric pressure (so that a physical pressure source could be omitted), so long as the required pressure relationship to provide the defined pressure differentials between the cell groups is attained. Similarly, one or more of the pressures might be negative to achieve the pressure relationship.

The examples discussed thus far have an optical guidance (transmission) window centred at 2.0 µm, so the data relating to optical loss shows loss at this wavelength. However, the invention is not limited in this regard, and optical fibres according to the various examples and embodiments can be tailored for optical waveguiding at any wavelength. The guidance window depends on the size and geometry of the fibre structure, and a fibre can be fabricated for guiding at any desired wavelength (typically from ultraviolet to mid-infrared wavelengths, about 10 nm to 20 µm) by homothetic scaling of the geometry [11, 12]. The manipulation of the region surrounding the hollow fibre core, in particular the core size ratio, the first ring ratio and the core node spacing, has similar benefits for any operational wavelength or range of wavelengths to which the fibre is scaled. Accordingly, hollow core photonic bandgap fibres according to the present disclosure can be fabricated for waveguiding at any required optical wavelength by appropriate selection of the size of the various components of the fibre.

As an example, a fibre structured for guiding centred at 2 µm would have an average cell pitch (cell centre to cell centre spacing) of 4 to 8 µm, and a fibre structure for guiding centred at 1550 nm would have an average cell pitch of 3 to 6 µm [9]. Regardless of the actual size such as cell pitch, and the corresponding operational wavelength, ranges for the metrics disclosed herein are applicable for fabrication of fibres with low optical propagation loss, such as 1.2 dB/km and below.

Figure 18:
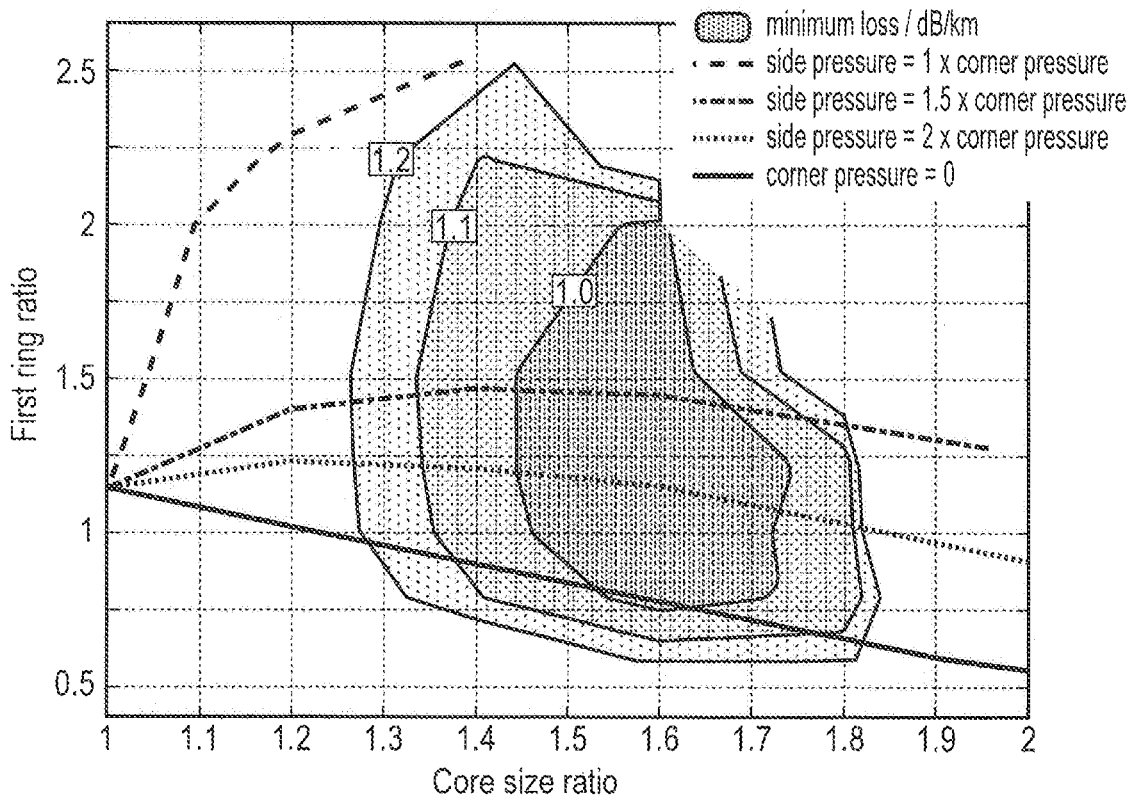
FIG. 18 shows another map of optical loss for varying core size ratio and first ring ratio for further example optical fibres fabricated according to a present example method.

FIG. 18 shows a loss map plot similar to the FIG. 9 plot but for optical loss at 1550 nm for fibres with six cladding rings and a 19-cell core. This demonstrates that the structural modifications according to the metrics described herein produce equivalent benefits at wavelengths other than 2 µm. The plot shows the influence of core size ratio and first ring ratio for a family of fibres that guide at 1550 nm, comparable to the data shown in FIG. 9 for a 2 µm family of fibres. Three low loss regions are shown. A region or area encompassing fibres with a loss of 1 dB/km and below at 1550 nm is shown. The extent of the shaded area indicates that to achieve a loss of 1 dB/km or below, a fibre should have a core size ratio between about 1.44 and about 1.74, and a first ring ratio between about 0.75 and 2.00 (for a core node spacing of about 1.00). A further region encompassing fibres with a loss of 1.1 dB/km or below is also shown; this includes the previous 1 dB/km area. As can be seen, to achieve a loss of 1.1 dB/km of less, a fibre should have a core size ratio between about 1.34 and 1.82, and a first ring ratio between about 0.65 and about 2.20 (for a core node spacing of about 1.00). Finally, a third region encompasses fibres with a loss of 1.2 dB/km or below, including the previous two areas. To achieve a loss of 1.2 dB/km or less, a fibre should have a core size ratio between about 1.26 and about 1.84, and a first ring ratio between about 0.55 and about 2.50 (for a core node spacing of about 1.00). Larger first ring ratios, beyond about 2.5, are likely to be difficult to fabricate because irreversible distortions in the structure may arise.

It will be appreciated that these metric values are similar to those for the longer wavelength fibres (2 μm), so the ranges are widely applicable for fibres at a range of operating wavelengths.

FIG. 18 also shows lines for various pressure relationships. Shown is a solid line representing a corner pressure of zero, a dotted line representing a side pressure two times the corner pressure, a dot-dash line representing a side pressure 1.5 times the corner pressure, and a dashed line representing equal side and corner pressures. These lines are comparable to and follow a similar pattern to those shown in the loss maps of FIGS. 8 and 9. Accordingly, the relationships between the four pressures (core, corner, side and cladding) described above are applicable to the 1550 nm fibres, and by extension, to other optical wavelengths to which a fibre may be tailored.

Where the particular examples discussed herein have referred to preforms, canes and fibres made from glass, this is generally intended to refer to silica and "silicate glasses" or "silica-based glasses", based on the chemical compound silica (silicon dioxide, or quartz), of which there are many examples. The various tubes or capillaries in a single preform, cane or fibre may be made from the same glass or from different glasses. The glass or glasses may include one or more dopants for the purpose of tailoring the optical properties, such as modifying absorption/transmission or enabling optical pumping. Also, the glass or glasses may include one or more dopants for the purpose of tailoring the material properties, such as modifying the fictive temperature, surface tension, viscosity, and/or chemical properties such as the water or chlorine content and associated chemical reactivity. Herein, the term "glass" is intended to refer to any material having appropriate physical and optical properties such that an optical fibre can be made from it according to the methods described herein, and while silicate glasses fall within this, other glass or glass-like materials may be used if they have the necessary properties; in general, a glass is a non-crystalline amorphous solid which exhibits a glass transition when heated towards the liquid state. This can include, for example, plastics and polymers.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

REFERENCES

[1] F. Benabid, "Hollow-core photonic bandgap fibre: new light guidance for new science and technology", Phil. Trans. R. Soc. A, 364, pp. 3439-3462, 2006

[2] T. Morioka, Y. Awaji, R. Ryf, P. Winzer, D. Richardson and F. Poletti, "Enhancing optical communications with brand new fibers" IEEE Communications Magazine, vol. 50, no. 2, pp. s31-s42, February 2012

[3] Roberts, P. J., Couny, F., Sabert, H., Mangan, B. J., Williams, D. P., Farr, L., Mason, M. W., Tomlinson, A., Birks, T. A., Knight, J. C. and Russell, P. S. J., "Ultimate low loss of hollow-core photonic crystal fibres", Optics Express, 13(1), pp. 236-244, 2005

[4] Sleiffer, V. A., Jung, Y., Baddela, N. K., Surof, J., Kuschnerov, M., Veljanovski, V., Hayes, J. R., Wheeler, N. V., Fokoua, E. R. N., Wooler, J. P. and Gray, D. R., "High capacity mode-division multiplexed optical transmission in a novel 37-cell hollow-core photonic bandgap fiber", Journal of Lightwave Technology, 32(4), pp. 854-863, 2014

[5] Fokoua, E. N., Richardson, D. J. and Poletti, F., "Impact of structural distortions on the performance of hollow-core photonic bandgap fibers", Optics Express, 22(3), pp. 2735-2744, 2014

[6] Jasion, G. T., Shrimpton, J. S., Chen, Y., Bradley, T., Richardson, D. J. and Poletti, F., "MicroStructure Element Method (MSEM): viscous flow model for the virtual draw of microstructured optical fibers", Optics Express, 23(1), pp. 312-329, 2015

[7] Fokoua, E. N., Sandoghchi, S. R., Chen, Y., Jasion, G. T., Wheeler, N. V., Baddela, N. K., Hayes, J. R., Petrovich, M. N., Richardson, D. J. and Poletti, F., "Accurate modeling of fabricated hollow-core photonic bandgap fibers", Optics Express, 23(18), pp. 23117-23132, 2015

[8] WO 2015/040187

[9] WO 2015/040189

[10] Jasion, G. T., Fokoua, E. R. N., Shrimpton, J. S., Richardson, D. J. and Poletti, F., "Combining Fluid Dynamics and Electromagnetics Modeling to Improve Hollow Core Photonic Band Gap Fibres" Workshop on Speciality Optical Fibers and their Applications (pp. WF2A-3), Optical Society of America, November 2015

[11] Poletti, Francesco, "Direct and inverse design of microstructured optical fibres", University of Southampton, Optoelectronic Research Centre, doctoral thesis, 2007.

[12] Chen, Y., Wheeler, N. V., Baddela, N. K., Hayes, J. R., Sandogchi, S. R., Fokoua, E. N., Li, M., Poletti, F., Petrovich, M. N. and Richardson, D. J., "Understanding wavelength scaling in 19-cell core hollow-core photonic bandgap fibers", Optical Fiber Communications Conference and Exhibition (OFC), (pp. 1-3), IEEE, March 2014.

The invention claimed is:

1. A hollow core photonic bandgap optical fibre comprising:
   a cladding comprising capillaries in a hexagonal array, the capillaries separated from each other by struts connected at nodes, the cladding having a cladding diameter; and
   a hollow core formed by excluding a hexagonal group of nineteen capillaries from the centre of the hexagonal array, the core having a core diameter; wherein
   the core is bounded by a first ring of capillaries comprising corner capillaries disposed adjacent to corners of the excluded group and side capillaries positioned between the corner capillaries;
   and the hexagonal array has dimensions such that:
   a core size ratio is between 1.34 and 1.82 inclusive;
      where the core size ratio is defined as a ratio of the core diameter to the cladding diameter normalised to the ratio of the core diameter to the cladding diameter in an optical fibre formed from the same number and arrangement of capillaries in an undistorted hexagonal array;

a first ring ratio is between 0.65 and 2.20 inclusive;
  where the first ring ratio is defined as a ratio of the length of radially aligned struts separating the capillaries of the first ring to the length of a strut in an undistorted hexagonal array with a core size ratio of 1; and
a core node spacing is between 0.60 and 1.90 inclusive;
  where the code node spacing is defined as a ratio of a strut length around the core of a largest corner capillary and a strut length around the core of a smallest side capillary.

2. A hollow core photonic bandgap optical fibre according to claim 1, in which the optical transmission loss is 1.1 dB/km or less for a wavelength of 1550 nm.

3. A hollow core photonic bandgap optical fibre according to claim 1, in which the core size ratio is between 1.44 and 1.74 inclusive and the first ring ratio is between about 0.75 and 2.00 inclusive.

4. A hollow core photonic bandgap optical fibre according to claim 3, in which the optical transmission loss is 1.0 dB/km or less for a wavelength of 1550 nm.

5. A hollow core photonic bandgap optical fibre according to claim 1, in which the optical transmission loss is 1.2 dB/km or less for a wavelength of 2000 nm.

6. A hollow core photonic bandgap optical fibre according to claim 5, in which the core size ratio does not exceed 1.80.

7. A hollow core photonic bandgap optical fibre according to claim 5, in which the core size ratio is between 1.45 and 1.75 inclusive, the first ring ratio is between about 0.70 and 1.50 inclusive, and the core node spacing is between 0.80 and 1.50 inclusive.

8. A hollow core photonic bandgap optical fibre according to claim 7, in which the optical transmission loss is 1.0 dB/km or less for a wavelength of 2000 nm.

9. A hollow core photonic bandgap optical fibre according to claim 5, in which the core size ratio is 1.65, the first ring ratio is 1.22, and the core node spacing is 1.20.

10. A hollow core photonic bandgap optical fibre according to claim 9, in which the optical transmission loss is 0.88 dB/km for a wavelength of 2000 nm.

11. A hollow core photonic bandgap optical fibre according to claim 1, in which the cladding comprises at least five concentric rings of capillaries around the core.

12. A hollow core photonic bandgap optical fibre according to claim 11, in which the cladding comprises five, six, seven or eight concentric rings of capillaries around the core.

13. A hollow core photonic bandgap optical fibre according to claim 1, in which the cladding comprises nine concentric rings of capillaries around the core, the core size ratio is 1.45 or above, and the optical transmission loss is 1.0 dB/km or less for a wavelength of 2000 nm.

14. A hollow core photonic bandgap optical fibre according to claim 13, in which the first ring ratio is 0.80 or above, and the optical transmission loss is 0.8 dB/km or less for a wavelength of 2000 nm.

15. A hollow core photonic bandgap optical fibre according to claim 1, in which the cladding is formed from one or more undoped or doped silicate glasses.

16. A hollow core photonic bandgap optical fibre according to claim 1, wherein the cladding includes cells in second and subsequent rings surrounding the first ring, wherein the cells in the second and subsequent rings have an undistorted radial thickness.

* * * * *